United States Patent
Ohenoja et al.

(10) Patent No.: US 7,440,394 B2
(45) Date of Patent: Oct. 21, 2008

(54) METHOD AND SYSTEM FOR REDUNDANT IP FORWARDING IN A TELECOMMUNICATIONS NETWORK

(75) Inventors: Jussi Ohenoja, Järvenpää (FI); Pia Talonpoika, Helsinki (FI); Kari Kokkonen, Helsinki (FI); Timo Patrikka, Espoo (FI); Jukka Haapala, Espoo (FI); Petri Jäppilä, Helsinki (FI)

(73) Assignee: Nokia Corporation, Espoo (FI)

( * ) Notice: Subject to any disclaimer, the term of this patent is extended or adjusted under 35 U.S.C. 154(b) by 571 days.

(21) Appl. No.: 11/013,968

(22) Filed: Dec. 17, 2004

(65) Prior Publication Data

US 2005/0099940 A1    May 12, 2005

Related U.S. Application Data

(63) Continuation of application No. PCT/FI03/00409, filed on May 27, 2003.

(30) Foreign Application Priority Data

Jun. 24, 2002   (FI) ................... 20021235

(51) Int. Cl.
H04J 1/16      (2006.01)
H04J 3/14      (2006.01)
(52) U.S. Cl. .................. 370/216; 370/217; 370/218
(58) Field of Classification Search ............ 370/216, 370/217, 218, 219, 220; 714/100, 1, 2
See application file for complete search history.

(56) References Cited

U.S. PATENT DOCUMENTS

| 6,049,524 | A | 4/2000 | Fukushima et al. |
| 6,487,605 | B1* | 11/2002 | Leung ................... 709/245 |
| 7,042,876 | B1* | 5/2006 | Jayasenan et al. ...... 370/389 |
| 2002/0089980 | A1 | 7/2002 | Rombeaut et al. |
| 2002/0141429 | A1 | 10/2002 | Pegrum et al. |
| 2002/0166080 | A1* | 11/2002 | Attanasio et al. ........ 714/15 |
| 2003/0088698 | A1* | 5/2003 | Singh et al. ............ 709/239 |
| 2003/0177209 | A1* | 9/2003 | Kwok et al. ............ 709/221 |
| 2005/0076231 | A1* | 4/2005 | Ichinohe et al. ........ 713/200 |
| 2006/0181406 | A1* | 8/2006 | Petite et al. ............ 340/521 |

FOREIGN PATENT DOCUMENTS

| WO | WO 02/47329 A2 | 6/2002 |
| WO | WO 02/078250 | 10/2002 |
| WO | WO 03/023637 | 3/2003 |

* cited by examiner

*Primary Examiner*—Ajit G Patel
(74) *Attorney, Agent, or Firm*—Squire, Sanders & Dempsey, LLP

(57) ABSTRACT

A new feature for a network element or a router is described herein. The feature is implemented in the router as a route manager object. The first function of the feature is realized by trapping routing messages that any process like routing daemon or the route manager object sends to the input/output manager and sends them forward to an appropriate function. The second function of the feature is realized by copying the routing messages from an active unit to another instance of the route manager running in the spare unit.

14 Claims, 1 Drawing Sheet

METHOD AND SYSTEM FOR REDUNDANT IP FORWARDING IN A TELECOMMUNICATIONS NETWORK

This is a Continuation of International Application No. PCT/FI2003/000409 filed May 27, 2003, which designated the U.S. and was published under PCT Article 21(2) in English.

FIELD OF THE INVENTION

The present invention relates to telecommunication networks. In particular, the present invention relates to a novel and improved method and system for redundant IP forwarding in a telecommunications network. More precisely the present invention applies to increasing redundancy in a multirouter environment where one IP router acts as a main element and a backup router is held in reserve for use in case of malfunction on the main router or its data links.

BACKGROUND OF THE INVENTION

Increasing redundancy in a multirouter environment where one IP router acts as a main element and a backup element is held in reserve for use in case of malfunction in said main router or its data links is an important question in the present IP (Internet Protocol) networks. There are some routines or protocols that are provided to implement this essential feature to the existing telecommunications and IP networks.

Usually the backup router is aware of the network and acts in the network environment as an active routing element. In case of malfunction on the main router the backup router takes over the functions of the main router and continues the routing and traffic forwarding task. There are well-known and standardised methods for creating such spare router groups.

VRRP (Virtual Router Redundancy Protocol) is an Internet protocol that provides a way to have one or more backup routers when using a statically configured router on a local area network (LAN). Although there are other alternatives, the most common arrangement is to specify one router to serve as the router for forwarding packets from a group of hosts on a LAN. If that router fails, however, there is no way to use another router as a backup. Using VRRP, a virtual IP address can be specified manually or with Dynamic Host Configuration Protocol (DHCP) as a default. A virtual IP address is shared among the routers, with one designated as the master router and the others as backups. In case the master fails, the virtual IP address is mapped to a backup router's IP address. This backup becomes the master router.

VRRP can also be used for load balancing. VRRP is part of both IPv4 (the version of IP that most networks currently use) and IPv6 (the modified and renewed version of Ipv4).

Hot Standby Router Protocol (HSRP) is another routing protocol. It allows host computers on the Internet or IP network to use multiple routers that act as a single virtual router, maintaining connectivity even if the first hop router fails, because other routers are on "hot standby"—ready to go. Configured on routers running the Internet Protocol (IP) over Ethernet, Fiber Distributed-Data Interface (FDDI), and token ring local area networks (LANs), HSRP provides automatic router backup.

As specified in IETF (Internet Engineering Task Force) Request for Comments (RFC) 2281, HSRP ensures that only a single router (called the active router) is forwarding packets on behalf of the virtual router at any given time. A standby router is chosen to be ready to become the active router, in the event that the current active router fails. HSRP defines a mechanism used to determine active and standby routers by referring to their IP addresses. Once these are determined, the failure of an active router will not cause any significant interruption of connectivity.

On any given LAN, there may be multiple, possibly overlapping, hot standby groups, each with a single Media Access Control (MAC) address and IP address; the IP address should belong to the primary subnet, but must be different from any actual or virtual addresses allocated to any routers or hosts on the network.

However, when there are two routers that use parallel links to same destination, it is possible to implement MSP1+1 redundancy between them in such a way that the active router will control both transmission lines. MSP (Multiplex Section Protection) is a protection for switching a signal in the multiplex section from a defective working channel to a protection channel. In 1+1 protection (or duplication) the same signal is transmitted simultaneously (by bridging) to two separate multiplex sections, known as "working" and "protection" or "spare" sections. The receiving node monitors the condition of the parallel physical data links and selects the proper signal.

This is done to protect the link in case of link failure in one of the transmission lines. This causes that the backup router cannot see the network because the active router has taken over its transmission medium.

There are at least two reasons for not using a redundancy scheme like VRRP or HSRP to implement the redundant IP forwarding in certain telecommunication networks. The first is that MSP1+1 redundancy scheme provides that the spare unit cannot transmit packets to the network around it, and could be in fact physically isolated from the surrounding network on the frame level. The second reason is that the implementation of the fast switching to the spare unit inside the network element is hidden from the host units by the switching fabric/backplane, again requiring the interfaces to be separated on the physical level.

The result is that the IP forwarding information must be transferred to the spare unit using something else than IP protocol.

Without any redundancy mechanism the information that is maintained by routing daemons in the working unit does not converge fast enough in the spare unit immediately after the switchover. This would cause a delay of seconds until the forwarding table of the spare unit is stable and the TCP/IP stack is able to do IP forwarding again. This is absolutely too much.

THE PURPOSE OF THE INVENTION

The purpose or target of the present invention is to provide a new type of redundant routing scheme in which the routing information that is maintained by routing daemons converges fast enough and immediately after the switchover in the spare unit. Further, the purpose of the present invention is to avoid a delay in the switchover due to the time that is consumed before the forwarding table is stable and the TCP/IP stack is able to do IP forwarding again.

Further, the object of the present invention is to provide a method and system for implementing a feature that can intercept, modify and transmit the routing information that is used in the main router to the backup router. Furthermore, the feature compresses the update messages to avoid overhead in communication between the main router and the backup router.

SUMMARY OF THE INVENTION

The invention describes a new feature for a network element or a router. The feature is implemented on said router as a route manager object. The first function of the feature is realized by trapping the routing messages that any process-like routing daemon or the route manager actor sends to the IP stack and sending them forward to the appropriate function. The second function of the feature is realized by copying the routing messages from the active unit to the other instance of the route manager running in the spare unit.

The implementation of the inventive feature can be divided into four different basic tasks. The feature has to update the forwarding information inside the working unit. It has to keep the forwarding information identical in both main and spare routers and to co-ordinate its state during start up and switchover procedures so that no forwarding information is lost and synchronization is maintained. Lastly, it has to keep the spare unit's routing daemon in isolation so that it cannot mess up the forwarding tables during the forwarding table replication procedure.

Examples of the possible network elements for the present invention are the radio network controller (RNC) or the media gateway (MGW) in the UMTS architecture, i.e. the third generation mobile networks. Furthermore the invention can be implemented in any network router that fulfils the conditions defined in the following description. In the preferred embodiment of the present invention the feature is working at IP layer.

The present invention provides at least two advantages in the situation where the backup router is unable to see the network. The first is the possibility of using MSP1+1 redundancy that eliminates link failures. The second advantage concerns the use where the router is connected to the other routers and host units via a fast switching fabric/backplane. In such a configuration it is extremely fast and transparent to other units to make a switchover to the backup router. The switching can be done in the physical layer so that the other units will not see anything change.

When the switchover occurs, the backup router becomes aware of the network around it, and it takes time to configure itself before it can function as a router. However, the time consumed can be decreased significantly and the reconfiguration time comes negligible using the redundant forwarding feature according to the present invention.

One of the advantages of the invention is also, that if all routing information is stored also in the spare unit's forwarding table, the routing daemon has time to collect the network topology on background after a switch-over. When the network topology has been resolved the routing daemon can update the forwarding table as usual.

BRIEF DESCRIPTION OF THE DRAWINGS

The accompanying drawing, that is included to provide a further understanding of the invention and constitute a part of this specification, illustrates embodiments of the invention and together with the description help to explain the principles of the invention. In the drawing

DETAILED DESCRIPTION OF THE INVENTION

Reference will now be made in detail to the embodiments of the present invention, examples of which are illustrated in the accompanying FIG. 1.

In the following detailed description there are used specific terms purely in order to illustrate the embodiments of the present invention. These terms are not restrictive and will be as follows. IP engine IPE is a network processor or program block that takes care of all IP forwarding in the router IP-NIU. Input/output Manager IOM implements the IP stack subsystem of the unit or router IP-NIU. Route manager RIISTA is a new program block provided by the present invention.

Figure 1:
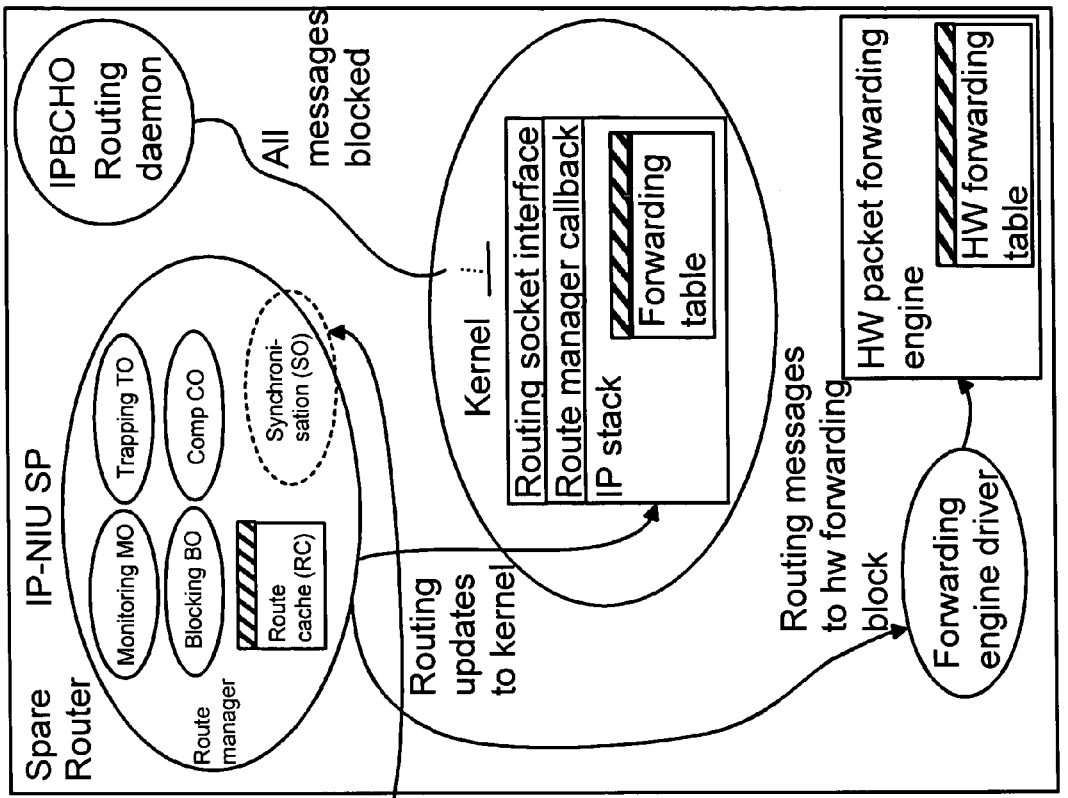
FIG. 1 is a block diagram of one embodiment of the present invention disclosing the synchronisation of the forwarding information, the updating of the forwarding information on the main router and updating of the forwarding information from the main router to the spare router.
Figure 1:
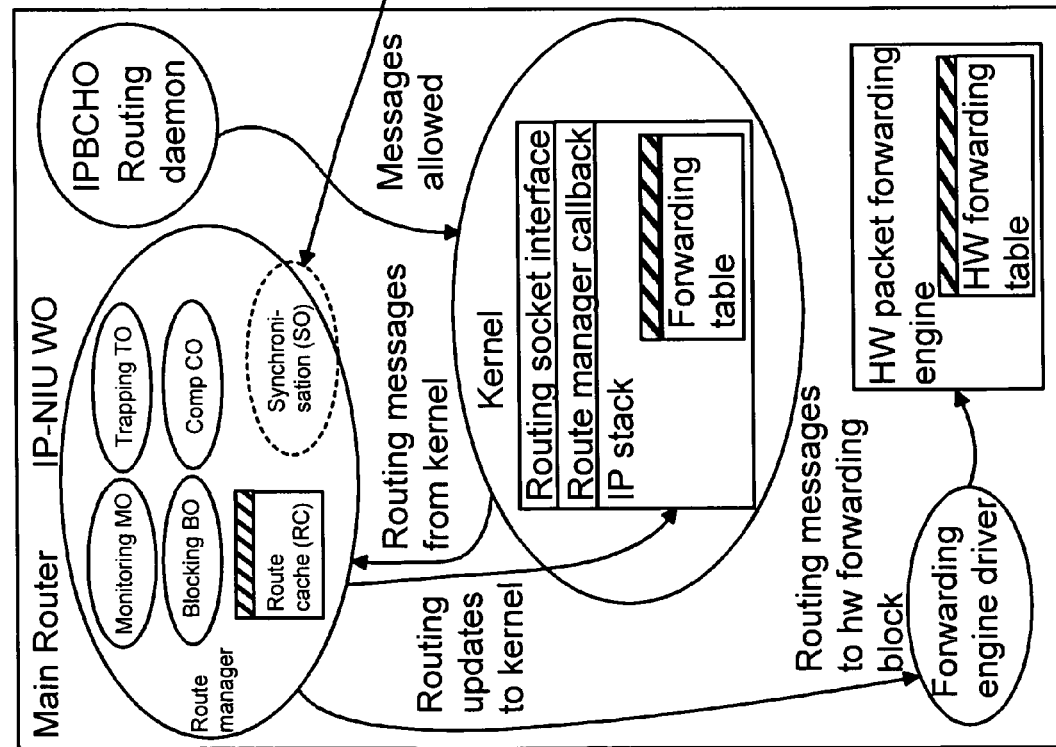

Referring to FIG. 1, the forwarding information that the routing daemon IPBCHO, that can be implemented for instance as an open shortest path first-process (OSPF), writes in routing socket, the information is trapped and sent to IPE. Input/output Manager IOM can only handle one route per destination, and so the multiple equal-cost routes that IP engine IPE supports are written only to IPE. There are some special cases that must be taken into account when creating equal cost routes. When the routing daemon IPBCHO creates first instance of a route to a destination it is written to both Kernel IOM and hardware packet forwarding engine IPE. When the routing daemon IPBCHO creates a second route to a destination that already has a route to, the information is written to both IOM and IPE. However, IOM will discard the previous route and use only the new one.

When the routing daemon deletes a route, the information is written to both IOM and IPE. However, if there is another existing route to the destination, the route manager will write that route to IOM to replace the route that was deleted.

The second task is the warming of the IOM and IPE HW forwarding tables in the spare unit. There are a lot of routing update messages exchanged when the unit configures itself first time after the starting of the network. After the steady state has been reached only state changes in network cause routing updates.

The master route manager RIISTA_MA on the main router WO acting as a master route manager has to maintain an accurate route cache RC of the IPE HW forwarding tables, because the write-only nature of the IPE does not allow querying the forwarding table directly. When the spare router SP starts (from power-down or reset status) the slave route manager RIISTA_SL that acts as a slave route manager on the spare router SP sends a message to the master route manager and receives the entire forwarding table.

When the master route manager RIISTA_MA knows that there is a slave route manager RIISTA_SL present it sends all routing updates to the slave as soon as they arrive.

The route manager RIISTA of the IP Network Interface Unit IP-NIU can be at least in three different states depending on the hardware configuration and the overall unit state. The states are SINGLE_MASTER, MASTER and SLAVE.

Referring further to FIG. 1, the route manager RIISTA updates the IPE HW forwarding table based on the routing update messages that other actors write to routing socket. The route manager maintains a cache copy of the IPE HW forwarding table and can answer forwarding table queries of other actors.

The second state is SINGLE_MASTER, i.e. master without an active slave unit. This is the case when a unit is configured to be a master, but there is no slave present. The slave may be faulty, not yet active or not yet recognised. The route manager updates the IPE HW forwarding table based on the routing update messages that other actors write to routing socket. The route manager maintains a route cache RC copy of the IPE HW forwarding table and can answer forwarding table queries of other actors. Further, the route manager tries to actively contact a slave counterpart.

In the third state, master with a slave, the route manager RIISTA runs as a master and controls the warming of a slave route manager running in spare SP unit. This is described in FIG. 1 in more detail. The master route manager RIISTA_MA updates the IPE HW forwarding table based on the routing update messages that other actors write to routing socket. The master route manager RIISTA_MA maintains a route cache RC copy of the IPE HW forwarding table and can answer forwarding table queries of other actors.

The master route manager RIISTA_MA transfers routing information to the slave route manager so that the forwarding tables of main WO and spare SP units are kept in synchronization.

The fourth state, SLAVE is the simplest. The route manager runs as slave RIISTA_SL and receives routing updates from a master route manager RIISTA_MA running in the main unit WO, see FIG. 1.

The slave route manager RIISTA_MA updates the IPE HW forwarding table based on the routing update messages that the master route manager RIISTA_MA sends.

The slave route manager RIISTA_SL maintains a cache copy of the IPE HW forwarding table and can answer forwarding table queries of other actors. It also receives routing information from the master route manager RIISTA_MA so that the forwarding tables of the main unit WO and the spare unit SP are kept in synchronisation. The slave route manager RIISTA_SL blocks the routing socket so that writes from a routing daemon do not mess up the forwarding table of the spare unit SP.

During switchover the master and slave route managers RIISTA_MA, RIISTA_SL change states so that the route manager in the new main unit becomes master and the route manager in the new spare unit becomes slave. The forwarding table coherency must be maintained during the switchover so that no route updates are lost. The new master route manager RIISTA_MA must keep the routing socket blocked until the routing daemon has had time to calculate the network topology so that the existing forwarding table is kept intact.

Only after the routing daemon has updated its internal network model, the route manager can release the block on the routing socket and start to update and transfer the forwarding table based on the routing socket messages. This is done by monitoring the interval between successive routing messages.

The route manager must make sure that there are no stale routes left hanging in the IP engine IPE forwarding table after the switchover. This can be done by removing the routes that are left in the cache before switchover but are not written to input/output Manager IOM after the new routing daemon has rebuilt its internal network model.

It is obvious to a person skilled in the art that with the advancement of technology, the basic idea of the invention may be implemented in various ways and in various network environments. The invention and its embodiments are thus not limited to the examples described above, instead they may vary within the scope of the claims.

The invention claimed is:

1. A method, comprising:
   isolating a routing daemon of a spare router from an active routing task,
   blocking an access method to an internet protocol stack of said spare router,
   monitoring an interval between successive routing messages,
   releasing a block on said access method of said spare router after the interval between the successive routing messages exceeds a time interval,
   updating routing information of a main router into said spare router, and
   connecting said isolated routing daemon of said spare unit into the active routing task during a switchover from the main router to the spare router to provide redundant data forwarding in a multirouter environment.

2. The method according to claim 1, further comprising:
   synchronising forwarding tables in said main router and said spare router.

3. The method according to claim 2, wherein said synchronising comprises synchronising said forwarding tables with system messages between said main router and said spare router.

4. The method according to claim 3, wherein said synchronising comprises synchronising with said system messages compressed for avoiding overhead in communication between said main router and said spare router.

5. The method according to claim 1, further comprising:
   trapping all routing messages on the main router, and
   copying every routing message of the main router onto the spare router.

6. The method according to claim 1, further comprising:
   updating and transferring, after the block on said access method of said router has been released, a forwarding table based on routing socket messages.

7. The method according to claim 1, further comprising:
   checking that there are no stale routes left hanging in internet protocol engine forwarding tables after the switchover.

8. The method according to claim 7, wherein said checking comprises removing routes that are left in a cache before the switchover but are not written to the internet protocol engine forwarding tables.

9. An apparatus, comprising:
   a processor configured to:
      isolate a routing daemon of a spare router from an active routing task;
      update routing information of a main router into said spare router; and
      connect said isolated routing daemon of said spare unit into the active routing task during a switchover from the main router to the spare router,
   said apparatus further comprising:
      a monitoring object configured to monitor an interval between successive routing messages; and
      a blocking object configured to create a block on an access method to an internet protocol stack of said spare router and configured to release the block on said access method of said spare router after the interval between the successive routing messages exceeds a time interval to provide redundant data forwarding in a multirouter environment.

10. The apparatus according to claim 9, wherein said apparatus further comprises a synchronising object configured to synchronise forwarding tables in said main router and said spare router.

11. The apparatus according to claim 9, wherein said apparatus further comprises a compressing object configured to compress system messages in order to avoid overhead in communication between said main router and said spare router.

12. The apparatus according to claim 9, wherein said apparatus further comprises a trapping object configured to trap all routing messages on the main router, and further configured to copy every routing message of the main router onto the spare router.

13. The apparatus according to claim 12, wherein said apparatus further comprises a route cache connected to said trapping object and configured to update a route table in said apparatus.

14. A apparatus, comprising:

processing means for
- isolating a routing daemon of a spare router from an active routing task;
- updating routing information of a main router into said spare router; and
- connecting said isolated routing daemon of said spare unit into the active routing task during a switchover from the main router to the spare router, said apparatus further comprising:
- monitoring means for monitoring an interval between successive routing messages, and
- blocking means for creating a blocking on an access method to an internet protocol stack of said spare router and for releasing the block on said access method of said spare router after the interval between the successive routing messages exceeds a time interval to provide redundant data forwarding in a multirouter environment.

* * * * *